United States Patent [19]
Shimomura

[11] 4,055,761
[45] Oct. 25, 1977

[54] LIGHT RECEIVING DEVICE FOR PHOTOELECTRIC CONVERSION ELEMENT

[75] Inventor: Jun Shimomura, Tokyo, Japan

[73] Assignee: Nippon Kogaku K.K., Tokyo, Japan

[21] Appl. No.: 663,733

[22] Filed: Mar. 4, 1976

[30] Foreign Application Priority Data

Mar. 14, 1975 Japan .............................. 50-33417[U]

[51] Int. Cl.² .......................... H01J 5/02; H01J 39/12
[52] U.S. Cl. .................................... 250/239; 250/216; 350/67
[58] Field of Search ....................... 250/239, 216, 226; 350/67

[56] References Cited

U.S. PATENT DOCUMENTS

| 2,918,584 | 12/1959 | Edsberg et al. | 250/239 |
| 3,215,850 | 11/1965 | Goodman | 250/239 |
| 3,880,528 | 4/1975 | Petersen et al. | 250/239 |

Primary Examiner—Alfred E. Smith
Assistant Examiner—David K. Moore
Attorney, Agent, or Firm—Fitzpatrick, Cella, Harper & Scinto

[57] ABSTRACT

A light receiving device for a photoelectric conversion element in an exposure meter etc., wherein a light converging optical system and a photoelectric conversion element are held in intimate contact with a transparent elastic sheet interposed therebetween.

7 Claims, 1 Drawing Figure

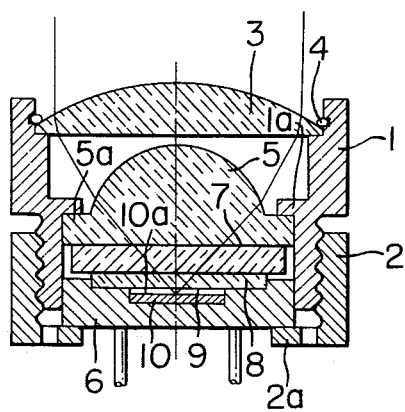

LIGHT RECEIVING DEVICE FOR PHOTOELECTRIC CONVERSION ELEMENT

BACKGROUND OF THE INVENTION

1. Field of the Invention

This invention relates to a light receiving device for a photoelectric element in an exposure meter. More particularly, the invention is concerned with an improved construction of the light receiving element for the purpose of enabling it to receive the maximum possible amount of light.

2. Description of the Prior Art

The technique of collecting light on a light receiving surface of a photoelectric element from a wide angle by adhering a substantially semi-circular lens to the light receiving surface has long been known. However, in utilizing this technique for increasing illumination on the light receiving surface of the photoelectric element, such as a silicon photo diode, in an exposure meter which is built into a photographic camera, there inevitably arise various problems such as those to be exemplified below.

Firstly, a technique of forming a substantially semi-circular light-converging lens by natural dripping of a liquid transparent resin such as epoxy resin, etc. on a chip of a photoelectric element has already been utilized in light emitting diodes. However, in this dripping technique, precision in the lens-shaped swelling is difficult to control with the result that considerable fluctuations occur in the light converging characteristic of each lens-shaped swelling, so that it is not always suitable for the exposure meter.

Secondly, a thin glass filter is adhered to the surface of the silicon photo diode for the exposure meter, the purpose of which is to correct a visual sensitivity, i.e. to permit light of a wavelength to be measured to pass therethrough. Further adherence onto this glass surface of acrylic resin in the form of a semi-circular lens apprehensively causes exfoliation or breakage of the filter glass due to thermal shock imparted thereto, such as by abrupt change in the temperature, which thermal shock is brought about by the difference in the thermal expansion coefficient between acrylic resin and glass. Nevertheless, when this semi-circular lens is made of glass, the difficulty in adhering the same onto the glass filters may be lessened, but the cost of polishing the semi-circular lens made of glass having a diameter of as small as a few millimeter is exceedingly high with the consequence that the light receiving device thus obtained becomes disadvantageously expensive.

Thirdly, regardless of whether the filter if made of glass or not, or whatever method may be adopted, the assembly cost necessary for controlling precision of the adhering position of the lens with respect to the chip is significant.

Fourthly, in case the lens and the photoelectric element are to be adhered together, if they are adhered with the optical axis of the lens being deviated from the center of the chip, the resultant element cannot be repaired and its rate of yield becomes remarkably inferior.

SUMMARY OF THE INVENTION

In view of various problems associated with the known light receiving device, I have conceived the present invention by which I am able to provide a light receiving device which is relatively inexpensive to manufacture, the fitted position between the light converging lens and the photoelectric element of which is easy to adjust, and incorporates therein a photoelectric element having high illumination in its receiving surface.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWING

A specific embodiment of my invention has been chosen for purposes of illustration and description, and is shown in the accompanying drawing wherein the single figure is a longitudinal cross-section illustrating a preferred embodiment of the light receiving device according to my invention.

DETAILED DESCRIPTION OF THE PREFERRED EMBODIMENT

Referring to the drawing there is shown a normal lens 3 fitted into a cylindrical main body 1 of the light receiving device and secured therein by a spring ring 4 or other known means. On the other hand, a chip 10 of a photoelectric (conversion) element such as a silicon photo diode and filter 8 are held in spaced relation on a supporting member 6. A transparent resin material 9, such as epoxy resin, silicon resin etc., having a refractive index larger than that of air fills the space between the chip 10 and the filter 8. The filter 8 is usually made of glass, is fixed onto the supporting member 6 so as to sufficiently cover the chip 10, and performs correction of visual sensitivity which is necessary when the device is used for the exposure meter of a photographic camera. The abovementioned component parts 8, 9 and 10 constitute the photoelectric conversion element in a broad sense of the term.

On the top surface of the filter 8, there is provided a thin transparent plastic sheet 7 such as silicone rubber, for exanple, having a degree of elasticity. A semi-circular light-converging lens 5 made of a plastic material is positioned on the plastic sheet 7. The lens 5 has a flange 5a on the circumference thereof which is engaged with a flange 1a projecting inwardly from the inner wall surface of the cylindrical main body 1. This lens 5 and the above-mentioned normal lens 3 together constitute a light converging optical system to collect light onto the llight receiving surface of the photoelectric element. The cylindrical main body 1 is provided on one outer peripheral portion thereof with a threaded part which is engaged with a cylindrical tightening member 2 having a corresponding threaded portion on the inner peripheral surface thereof. The tightening member 2 also has flange 2a at the lower end thereof to be engaged with the bottom surface of the supporting member 6 fitted within the main body 1.

When the threaded part of the cylindrical tightening member 2 is screw fitted on the threaded part of the cylindrical main body 1 to intimately join the photoelectric element 8, 9, 10, the transparent elastic sheet 7, and the light converging lens 5 between the flanges 1a and 2a under pressure exerted by the screw-tightening action, elastic deformation of the sheet 7 caused by the pressure removes air from between the lower surface of the lens 5 and the upper surface of the sheet 7 and from between the lower surface of the sheet 7 and the upper surface of the filter 8. Incidentally, the refractive index of the above-mentioned silicone rubber is approximately 1.4 to 1.5, and that of the plastic material for the elastic sheet is approximately 1.5. Therefore, the refractive indexes of the light converging lens 5, the elastic sheet 7, and the filter 8 can all be made substantially equal with the consequence that the incident light into the lens 5 is neither refracted nor reflected at either of the contact surfaces, but reaches the light receiving surface 10a substantially without deflection, whereby illumination of the light receiving surface can be increased. Furthermore, the lens 5 and the photoelectric element 8 – 10 are freely separable at any time, hence the photoelectric element alone can be replaced with facility, if necessary.

In the above described embodiment of the present invention, the lens 5, the elastic sheet 7, and the photoelectric element 8 – 10 are intimately joined together by the flange portions 1a and 2a. It is of course possible, however, that this press-contacting of the three component parts may be done by the use of an appropriate spring member. Moreover, when it is apprehended that the center of the light receiving surface of the chip 10 may deviate from the center of the supporting member 6, an appropriate degree of play is given between the main body 1 and the outer periphery of the supporting member 6, whereby the center of these component parts can be easily adjusted to and aligned with the optical axis of the lens.

Since, according to the present invention, the elastically deformable plastic sheet 7 is interposed between the lens and the filter 8 to maintain intimate contact between the lens 5 and the sheet 7, as well as between the sheet 7 and the filter 8, intervention of air between these contact surfaces can be prevented without the use of an adhesive agent. Further, even if abrupt temperature variation takes place in these closely contacted members, or mechanical shock is imparted thereto, the elastic sheet 7 functions as a buffer, so that the light transmission capability of the light converging optical system is not impaired. Moreover, in the present embodiment, the semi-circular lens 5 is contacted by the elastic sheet 7. It should, however, be noted that the optical element which contacts the elastic sheet 7 and constitutes a part of the light converging optical system is not limited to this arrangement, but that any other arrangement of the light converging optical system including the optical element and having the required converging effect may of course be useful for the purpose of the present invention.

I believe that the construction and function of my novel light receiving device will now be understood and that the advantages thereof will be fully appreciated by those persons skilled in the art.

I claim:

1. A light receiving device for a photoelectric conversion element, comprising:
    a. transparent covering means for covering said conversion element to exclude presence of air between said conversion element and said covering means;
    b. a transparent, elastic sheet positioned on said covering means;
    c. a light converging optical system for converging light beams incident on said photoelectric conversion element, said optical system including a lens positioned on said sheet, said lens, said sheet and said covering means being similar in refractive index; and
    d. means for tightening together said covering means, said sheet and said lens whereby air is excluded from between the contacting surfaces of said covering means and said sheet, and the contacting surfaces of said sheet and said lens.

2. A light receiving device according to claim 1, wherein said lens is a convergent one of which the front surface remote from said sheet is convex.

3. A light receiving device according to claim 2, wherein the rear surface of said lens contacting said sheet is flat.

4. The light receiving device as claimed in claim 1, wherein said lens has a flanged portion on the circumference thereof, said flanged portion being engaged with said tightening means.

5. A light receiving device as claimed in claim 4, further comprising a first casing accommodating said lens and having an engaging portion inwardly projecting from the inner wall thereof, said engaging portion being engaged with the flanged portion of said lens, and a second casing having an engaging portion inwardly projecting from the inner wall thereof so as to be engaged with said photoelectric conversion element, and means whereby said engaging portions may be urged towards one another so that said lens, said sheet, and said photoelectric conversion element are tightly held between said engaging portions of said first and second casings.

6. A light receiving device as claimed in claim 5, wherein said means whereby said engaging portions may be urged towards one another are constituted by mutually engaging threads on said first and second casings.

7. A light receiving device as claimed in claim 1, wherein said photoelectric conversion element includes a photoelectric substance and said covering means includes a filter underlying said sheet and a resin material filling the space between said photoelectric substance and said filer.

* * * * *